(12) United States Patent
Nomura

(10) Patent No.: US 10,208,797 B2
(45) Date of Patent: Feb. 19, 2019

(54) TAPERED ROLLER BEARING

(71) Applicant: Shuhei Nomura, Iwata (JP)

(72) Inventor: Shuhei Nomura, Iwata (JP)

(73) Assignee: NTN CORPORATION, Osaka (JP)

( * ) Notice: Subject to any disclaimer, the term of this patent is extended or adjusted under 35 U.S.C. 154(b) by 219 days.

(21) Appl. No.: 14/884,261

(22) Filed: Oct. 15, 2015

(65) Prior Publication Data

US 2016/0032974 A1 Feb. 4, 2016

Related U.S. Application Data

(63) Continuation of application No. PCT/JP2014/060480, filed on Apr. 11, 2014.

(30) Foreign Application Priority Data

Apr. 17, 2013 (JP) .................. 2013-086457

(51) Int. Cl.
*F16C 33/58* (2006.01)
*F16C 43/06* (2006.01)
(Continued)

(52) U.S. Cl.
CPC .......... *F16C 33/585* (2013.01); *F16C 19/364* (2013.01); *F16C 33/586* (2013.01);
(Continued)

(58) Field of Classification Search
CPC ...... F16C 33/585; F16C 43/06; F16C 19/364; F16C 33/586; F16C 43/04; F16C 2240/30;
(Continued)

(56) References Cited

U.S. PATENT DOCUMENTS

| 4,203,635 A | 5/1980 | Reiter |
| 4,728,204 A | 3/1988 | Colanzi et al. |

(Continued)

FOREIGN PATENT DOCUMENTS

| CN | 102918287 A | 2/2013 |
| DE | 3520814 | 12/1986 |

(Continued)

OTHER PUBLICATIONS

Machine Translation of JP 2001-208054 dated Jan. 2008.*

(Continued)

*Primary Examiner* — Alan B Waits

(57) ABSTRACT

A tapered roller bearing includes: inner and outer rings; tapered rollers; and a retainer for the tapered rollers so as to prevent the rollers from being removed towards an outer diameter side. The inner ring has a small collar portion having a reduced diameter section neighboring an inner ring raceway. The reduced diameter section has an outer diameter surface of a diameter smaller than the remaining section of the small collar portion. An outer diameter of the remaining section of the small collar portion is larger than an inscribed circle diameter, and an outer diameter of the reduced diameter section is smaller than the inscribed circle diameter, which represents a diameter of a circle inscribed in the tapered rollers in an assembly of rollers and retainer, where the tapered rollers are retained by the retainer and the assembly has not been incorporated into the inner ring.

4 Claims, 6 Drawing Sheets

(51) Int. Cl.
*F16C 19/36* (2006.01)
*F16C 43/04* (2006.01)
(52) U.S. Cl.
CPC .............. *F16C 43/04* (2013.01); *F16C 43/06* (2013.01); *F16C 2240/30* (2013.01); *F16C 2240/34* (2013.01); *F16C 2240/40* (2013.01); *F16C 2240/70* (2013.01)
(58) Field of Classification Search
CPC .............. F16C 2240/34; F16C 2240/40; F16C 2240/70
See application file for complete search history.

(56) References Cited

U.S. PATENT DOCUMENTS

| | | |
|---|---|---|
| 8,899,840 B2 | 12/2014 | Shimizu |
| 2002/0044707 A1 | 4/2002 | Hanai et al. |
| 2005/0047699 A1 | 3/2005 | Tsujimoto |
| 2005/0047700 A1 | 3/2005 | Tsujimoto |
| 2007/0047865 A1 | 3/2007 | Nakamizo et al. |
| 2007/0133914 A1 | 6/2007 | Matsuyama et al. |
| 2008/0013875 A1 | 1/2008 | Tsujimoto |
| 2010/0316321 A1 | 12/2010 | Nakamizo et al. |
| 2013/0089285 A1 | 4/2013 | Shimizu |

FOREIGN PATENT DOCUMENTS

| | | |
|---|---|---|
| EP | 1 510 707 A2 | 3/2005 |
| JP | 55-20988 | 2/1980 |
| JP | 2001-208054 | 8/2001 |
| JP | 2002-61655 | 2/2002 |
| JP | 2007-321939 | 12/2007 |
| JP | 2007-321940 | 12/2007 |
| JP | 2008-8466 | 1/2008 |
| JP | 2008-180375 | 8/2008 |
| JP | 2008-261368 | 10/2008 |
| JP | 2010-127323 | 6/2010 |
| JP | 2011-208725 | 10/2011 |
| JP | 2012-013134 | 1/2012 |
| JP | 2012-036993 | 2/2012 |
| JP | 2013-040634 | 2/2013 |
| WO | WO 2005/045269 A1 | 5/2005 |

OTHER PUBLICATIONS

Chinese Office Action dated Dec. 2, 2016 in corresponding Chinese Patent Application No. 20148002114.2.
Japanese Office Action dated Dec. 6, 2016 in corresponding Japanese Patent Application No. 2013-086457.
Chinese Office Action dated Jun. 9, 2017 in corresponding Chinese Patent Application No. 201480021114.2.
Extended European Search Report dated Jan. 12, 2017 in corresponding European Patent Application No. 14785432.7.
PCT International Preliminary Report on Patentability dated Oct. 29, 2015 in corresponding International Patent Application No. PCT/JP2014/060480.
International Search Report dated Jul. 15, 2014 in corresponding international application PCT/JP2014/060480.

* cited by examiner

Fig. 8A - Prior Art
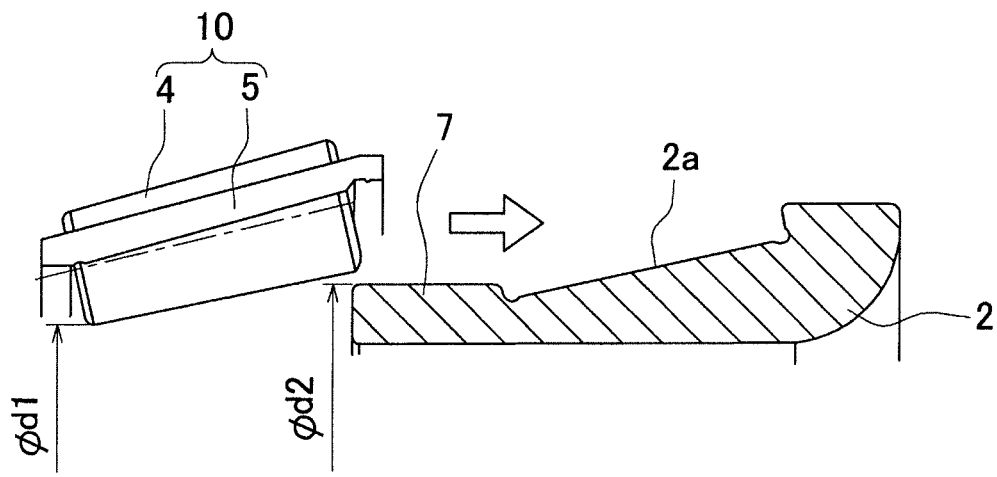
Fig. 8B - Prior Art
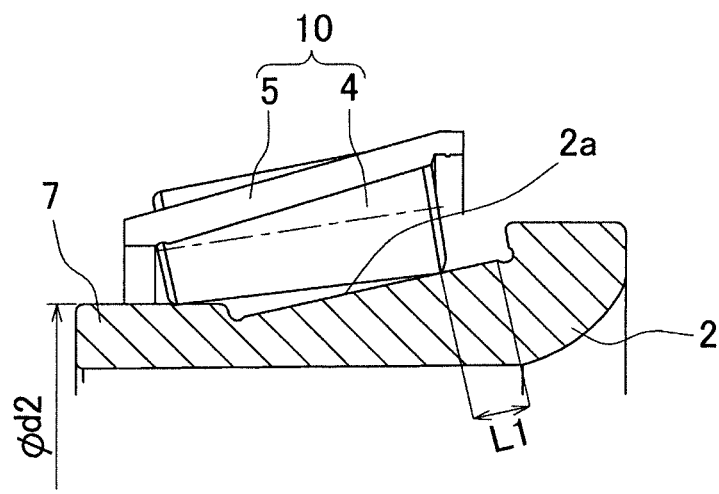

TAPERED ROLLER BEARING

CROSS REFERENCE TO THE RELATED APPLICATION

This application is a continuation application, under 35 U.S.C. § 111(a), of international application No. PCT/JP2014/060480, filed Apr. 11, 2014, which claims priority to Japanese patent application No. 2013-086457, filed Apr. 17, 2013, the disclosure of which are incorporated by reference in their entirety into this application.

BACKGROUND OF THE INVENTION

Field of the Invention

The present invention relates to tapered roller bearings used as, for example, wheel bearings, and particularly to a technique for preventing inner ring raceways from being damaged during assembling.

Description of Related Art

When a tapered roller bearing is assembled, rollers and a retainer are previously incorporated into an inner ring, to form an inner ring sub-assembly, and the inner ring sub-assembly is incorporated into an outer ring. As shown in FIG. 8A, an outer diameter ϕd2 of a small collar portion 7 of an inner ring 2 is set to be larger than an inscribed circle diameter ϕd1 of a circle inscribed in arranged rollers such that the rollers or the retainer do not drop from the inner ring sub-assembly, for example, when the inner ring sub-assembly is incorporated into the outer ring or when other handling is performed. The inscribed circle diameter ϕd1 is a diameter of a circle which is inscribed in arranged rollers 4 when an assembly 10 of the rollers and the retainer in which each roller 4 is retained by a retainer 5 has not been incorporated into the inner ring 2. In FIG. 8A, the outer diameter ϕd2 of the small collar portion 7 is enlarged in an exaggerated manner as compared to the inscribed circle diameter ϕd1. However, difference between the diameters ϕd1 and ϕd2 cannot be visually recognized in practice.

To date, for ball bearings, suggestions for preventing dropping of balls and a retainer and preventing damage during incorporation in a case where an assembly of the balls and the retainer is incorporated into an inner ring, have been made (for example, Patent Document 1). However, for tapered roller bearings, similar suggestion has not been made.

RELATED DOCUMENT

Patent Document

[Patent Document 1] JP Laid-open Patent Publication No. 2010-127323

SUMMARY OF THE INVENTION

In a tapered roller bearing, when an iron plate retainer is used, a portion, on the small diameter side, of the retainer is previously expanded so as to enlarge the diameter of the portion, and the portion, on the small diameter side, of the retainer is caulked to reduce the diameter after an assembly of rollers and the retainer is incorporated into an inner ring. Therefore, the assembly of the rollers and the retainer can be incorporated into the inner ring without difficulty.

On the other hand, when a resin retainer is used, the retainer is formed by injection molding so as to have a final shape obtained when the assembling into a bearing is completed. Therefore, when the assembly 10 of the rollers and the retainer is incorporated into the inner ring 2, the retainer 5 is elastically deformed such that the inscribed circle diameter ϕd1 for the arranged rollers is larger than the outer diameter ϕd2 of the small collar portion 7 of the inner ring 2. Thus, when each roller 4 passes over the small collar portion 7 of the inner ring 2, the roller 4 is pressed against the small collar portion 7. Thus, as shown in FIG. 8B, the roller 4 is tilted toward an inner ring raceway 2a due to friction between the outer diameter surface of the small collar portion 7 and an edge, on the small diameter side, of the roller 4, and an edge, on the large diameter side, of the roller 4 contacts with the inner ring raceway 2a. When the roller 4 is pressed in this state, the edge, on the large diameter side, of the roller 4 and the inner ring raceway 2a rub against each other in a range indicated by L1 in FIG. 8B, so that the inner ring raceway 2a may be damaged.

An object of the present invention is to provide a tapered roller bearing that allows an assembly of rollers and a retainer to be incorporated into an inner ring without damaging an inner ring raceway.

A tapered roller bearing in accordance with the present invention includes: an inner ring; an outer ring; a plurality of tapered rollers interposed between the inner ring and the outer ring; a retainer that retains the tapered rollers so as to prevent the tapered rollers from being removed on an outer diameter side. The inner ring is formed with a small collar portion, and the small collar portion has a reduced diameter section at a location neighboring an inner ring raceway of the inner ring, the reduced diameter section having an outer diameter surface of a diameter smaller than the remaining section of the small collar portion, and an outer diameter ϕd2 of the remaining section of the small collar portion is larger than an inscribed circle diameter ϕd1, and an outer diameter ϕd3 of the reduced diameter section is smaller than the inscribed circle diameter ϕd1, where the inscribed circle diameter ϕd1 represents a diameter of a circle that is inscribed in the arranged tapered rollers in an assembly of the rollers and the retainer, in a condition in which in the assembly, the tapered rollers are retained by the retainer and the assembly has not been incorporated into the inner ring.

In this configuration, since the outer diameter ϕd3 of the reduced diameter section of the small collar portion is smaller than the inscribed circle diameter ϕd1 of the assembly of the rollers and the retainer which has not been incorporated into the inner ring, also in the case where the retainer made of resin is elastically deformed to allow the assembly of the rollers and the retainer to be incorporated into the inner ring, the tapered rollers are not pressed against the small collar portion when each tapered roller passes over the small collar portion of the inner ring. Therefore, the edge, on the large diameter side, of each tapered roller is not strongly pressed against the inner ring raceway, whereby the inner ring raceway is not damaged.

The reduced diameter section of the small collar portion may be continued to a base level diameter section on an end surface side of the small collar portion via a stepped section, and the outer diameter surface of the reduced diameter section may be formed as a cylindrical surface. Alternatively, the small collar portion may have a tapered section in which an outer diameter thereof gradually increases from an end on the inner ring raceway side toward an opposing side away from the inner ring raceway side, and a section of the tapered section having an outer diameter smaller than the inscribed circle diameter ϕd1 may be defined as the reduced diameter section.

In each case, when the assembly of the rollers and the retainer is incorporated into the inner ring, the edge, on the large diameter side, of the tapered roller may not be strongly pressed against the inner ring raceway, whereby the inner ring raceway is not damaged.

An axial length X from an end, on the base level diameter section side, of the reduced diameter section to an end, on a small diameter side, of the inner ring raceway may be defined so as to satisfy the following relational expression:

$$X \geq RBAS \cdot \cos\theta - \{(\phi d2/2) + l \sin\alpha\}/\tan\theta$$

where a distance from a point of intersection of a bearing center axis and the inner ring raceway to an end surface, on the inner ring raceway side, of a large collar portion provided in the inner ring is represented as RBAS, a tilt angle of the inner ring raceway relative to the bearing center axis is represented as $\theta$, a length of a rolling surface of the tapered roller is represented as l, and a tilt angle of the rolling surface of the tapered roller relative to an outer diameter surface, having a cylindrical shape, of the base level diameter section on the end surface side is represented as $\alpha$. In the expression, $0 \leq \alpha \leq \theta$ is satisfied.

By the axial length X being defined as described above, when the assembly of the rollers and the retainer is incorporated into the inner ring, the edge, on the large diameter side, of the tapered roller can be prevented from being strongly pressed against the inner ring raceway.

In the tapered roller bearing in accordance with one embodiment of the present invention, the rolling surface of the tapered roller in the assembly of the rollers and the retainer, may be greased.

Thus, generation of damage in the inner ring raceway due to contact with the tapered rollers can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIG. 8A is a cross-sectional view illustrating a state immediately preceding incorporation of an assembly of rollers and a retainer into an inner ring of a conventional tapered roller bearing; and FIG. 8B is a cross-sectional view illustrating a state where the assembly of a conventional tapered roller bearing is being incorporated.

DESCRIPTION OF EMBODIMENTS

A first embodiment of the present invention will be described with reference to FIG. 1 to FIG. 5A to 5C.

Figure 1:
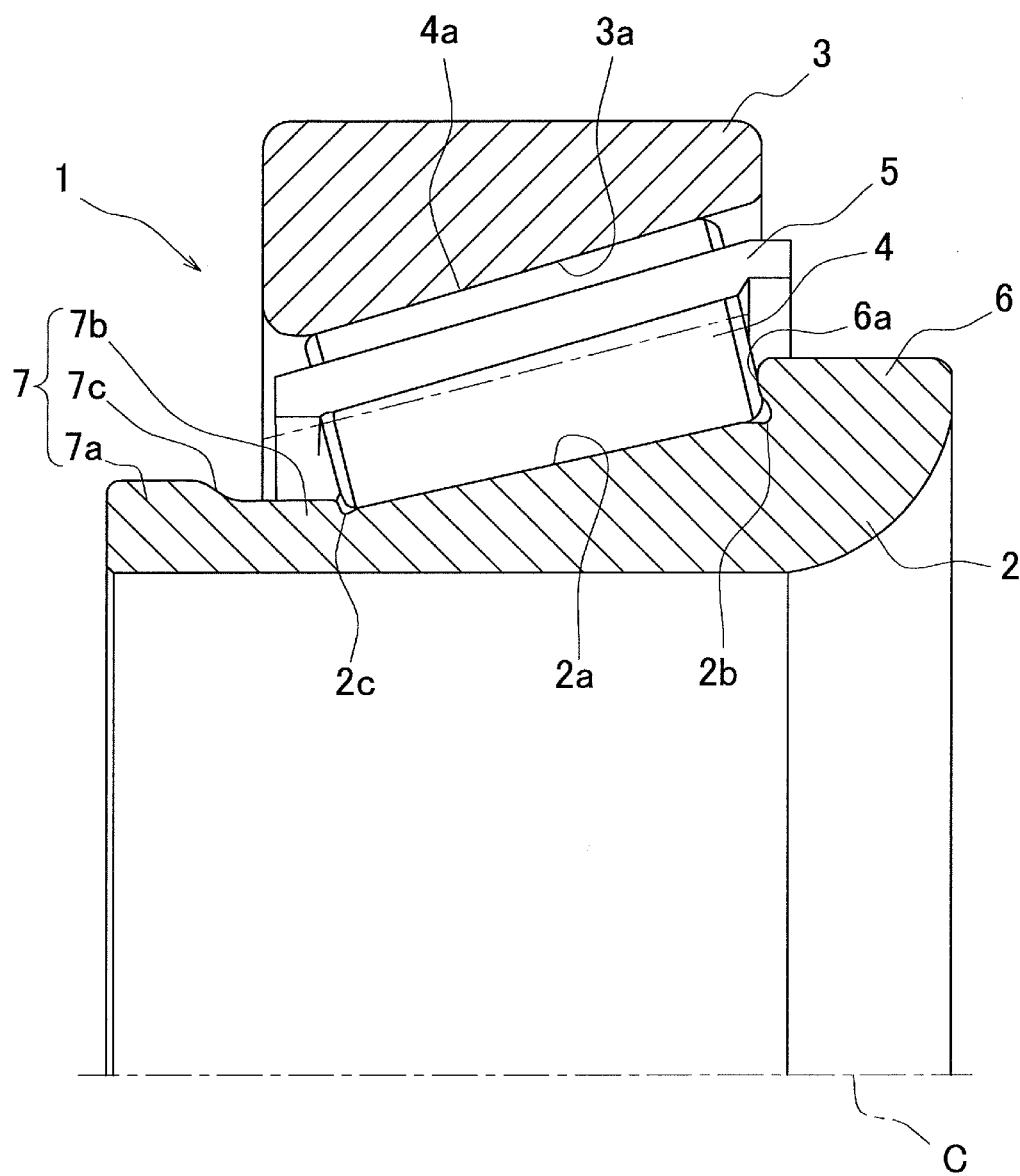
FIG. 1 is a cross-sectional view of a tapered roller bearing according to a first embodiment of the present invention.

As shown in FIG. 1, a tapered roller bearing 1 includes an inner ring 2, an outer ring 3, a plurality of tapered rollers 4 interposed between the inner ring 2 and the outer ring 3, and a retainer 5 that retains the tapered rollers 4. The inner ring 2 has on its outer circumference an inner ring raceway 2a formed as a conical surface. The inner ring 2 has a large collar portion 6 and a small collar portion 7 on the large diameter side and the small diameter side, respectively, of the inner ring raceway 2a. The inner ring raceway 2a has recessed sections 2b and 2c formed at both ends, respectively. The outer ring 3 has on its inner circumference an outer ring raceway 3a formed as a conical surface opposing the inner ring raceway 2a, and the outer ring 3 has no collar portion. Each of the tapered rollers 4 has on its outer circumference a rolling surface 4a, and is capable of rolling between the inner ring raceway 2a and the outer ring raceway 3a. The retainer 5 has a plurality of pockets 5a (FIG. 3) spaced from each other at predetermined intervals in the circumferential direction, and retains the tapered rollers 4 in the pockets 5a, respectively. The retainer 5 is made of, for example, resin, and produced by injection molding.

Figure 2:
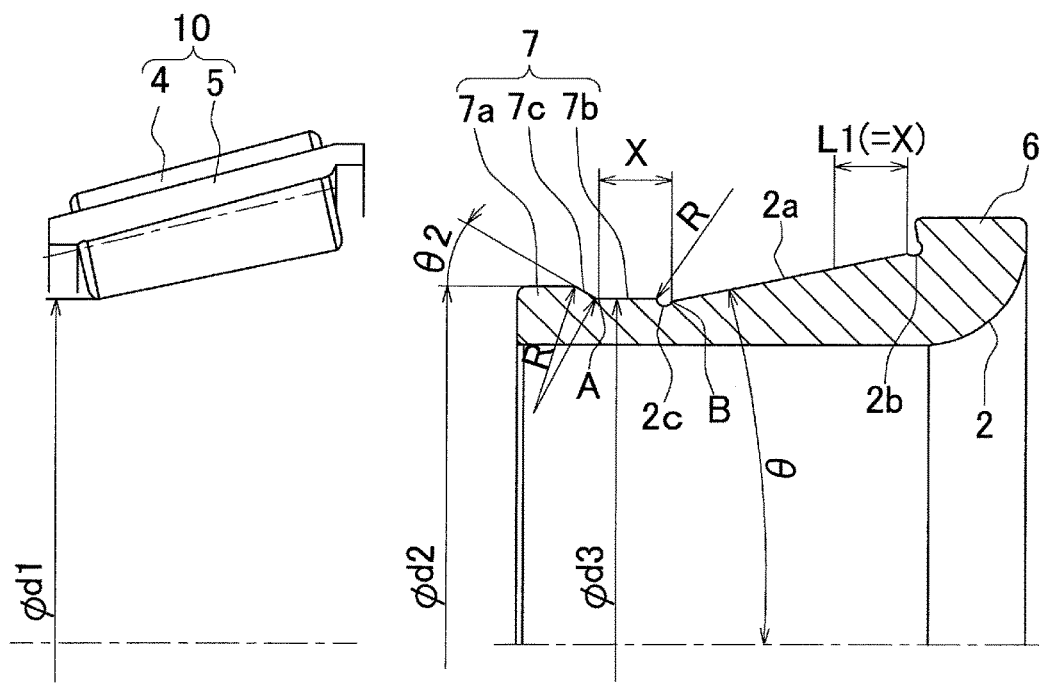
FIG. 2 is a cross-sectional view of an assembly of rollers and a retainer, and an inner ring in the tapered roller bearing.

As shown in FIG. 2, the small collar portion 7 of the inner ring 2 has a base level diameter section 7a on an end surface 2d side, and a reduced diameter section 7b neighboring the inner ring raceway 2a and having an outer diameter surface having a diameter smaller than that of the base level diameter section 7a. The base level diameter section 7a and the reduced diameter section 7b have respective outer diameter surfaces each in the form of a cylindrical surface. An outer diameter $\phi d2$ of the base level diameter section 7a is larger than an inscribed circle diameter $\phi d1$ of a circle inscribed in the arranged tapered rollers 4, and an outer diameter $\phi d3$ of the reduced diameter section is smaller than the inscribed circle diameter $\phi d1$. The inscribed circle diameter $\phi d1$ represents a diameter obtained in a condition in which in an assembly 10 of the rollers and the retainer the tapered rollers 4 are retained by the retainer 5 and the assembly has not been incorporated into the inner ring 2.

Figure 3:
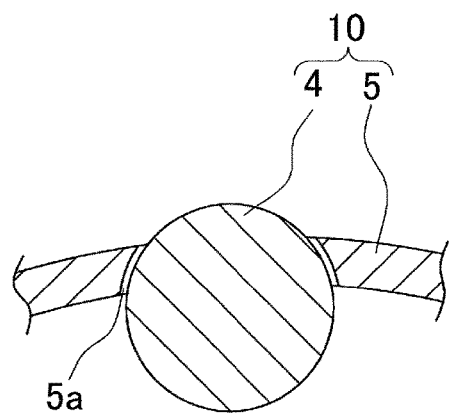
FIG. 3 is a cross-sectional view of a portion of the assembly of the rollers and the retainer.
Figure 5A:
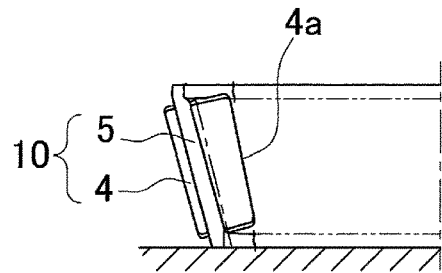
FIG. 5A illustrates process steps of assembling the tapered roller bearing.

As shown in FIG. 3, each pocket 5a of the retainer 5 is shaped so as to be narrowed on the outer diameter side and widened on the inner diameter side. The tapered rollers 4 are inserted into the pockets 5a from the inner diameter side to form the assembly 10 of the rollers and the retainer. The tapered rollers 4 can be inserted into or removed from the pockets 5a on the inner diameter side, and are prevented from being removed on the outer diameter side. The assembly 10 of the rollers and the retainer is placed on the horizontal surface or the like such that the small diameter side of the retainer 5 is the lower side when the assembly 10 is incorporated into the inner ring 2 as shown in FIG. 5A. In this condition, the tapered rollers 4 in the respective pockets 5a are tilted toward the outer diameter side to contact with the retainer 5. The condition in which the assembly 10 has not been incorporated, described above represents this state.

The base level diameter section 7a is continued to the reduced diameter section 7b via a stepped section 7c. Therefore, the reduced diameter section 7b has a diameter smaller than the remaining section (the base level diameter section 7a and the stepped section 7c) of the small collar portion 7. The stepped section 7c is formed as a tilt surface that has its diameter gradually decreases from the base level diameter section 7a side toward the reduced diameter section 7b. For example, a tilt angle θ2 of the stepped section 7c may be, but is not limited to, about 45°. In a boundary between the stepped section 7c and the base level diameter section 7a and a boundary between the stepped section 7c and the reduced diameter section 7b, chamfered portions R having an arc-shaped cross-section are formed, respectively. Further, in the end portion on the inner ring raceway 2a side of the reduced diameter section 7b, a chamfered portion R having an arc-shaped cross-section is formed.

Figure 4A:
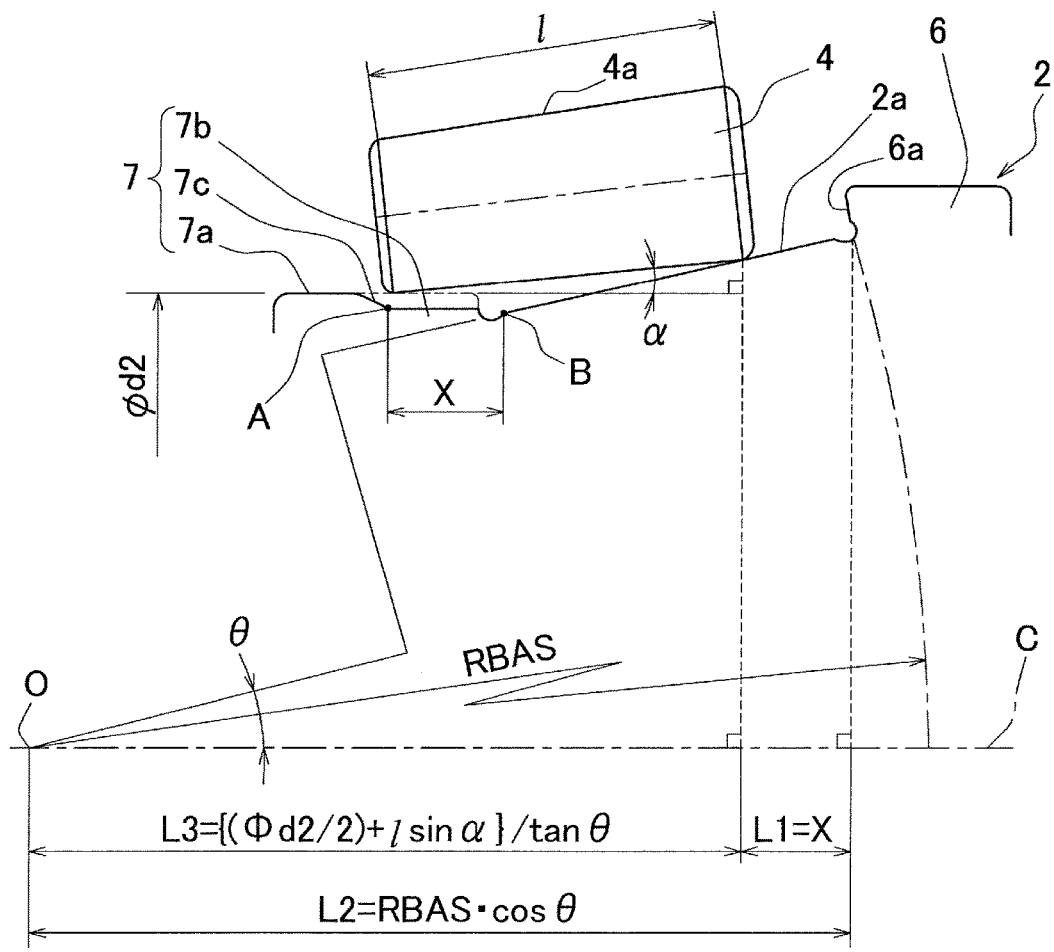
FIG. 4A is a diagram showing dimensions of portions of the tapered roller bearing.

A position A, at an end on the base level diameter section side, of the reduced diameter section 7b (in this example, the end on the stepped section 7c side) is defined as follows (see FIG. 4A). Specifically, where a distance from a point of intersection O of a bearing center axis C and the inner ring raceway 2a to an end surface 6a, on the inner ring raceway 2a side, of the large collar portion 6 is represented as RBAS, a tilt angle of the inner ring raceway 2a relative to the bearing center axis C is represented as θ, a length of the rolling surface 4a of the tapered roller 4 is represented as l, and a tilt angle of the rolling surface 4a of the tapered roller 4 relative to an outer diameter surface of the base level diameter section 7a of the small collar portion 7 is represented as α, the position A is defined such that an axial length X from the position A to a position B at the end, on the small diameter side, of the inner ring raceway 2a is represented by the following relational expression:

$$X \geq RBAS \cdot \cos\theta - \{(\phi d2/2) + l \sin\alpha\}/\tan\theta \quad \text{(Expression 1)}$$

where $0 \leq \alpha \leq \theta$ is satisfied. The reason for the above definition will be described later.

Figure 5B:
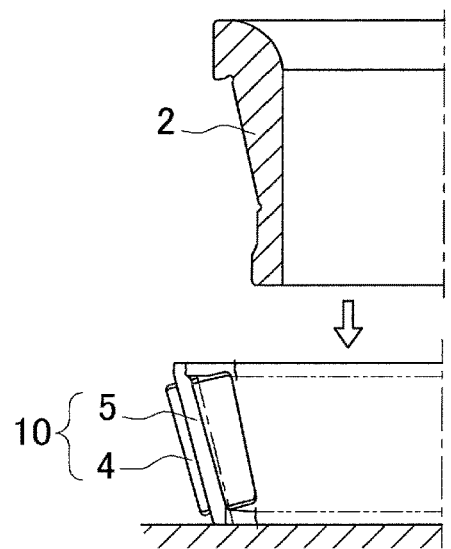
FIG. 5B illustrates process steps of assembling the tapered roller bearing.
Figure 5C:
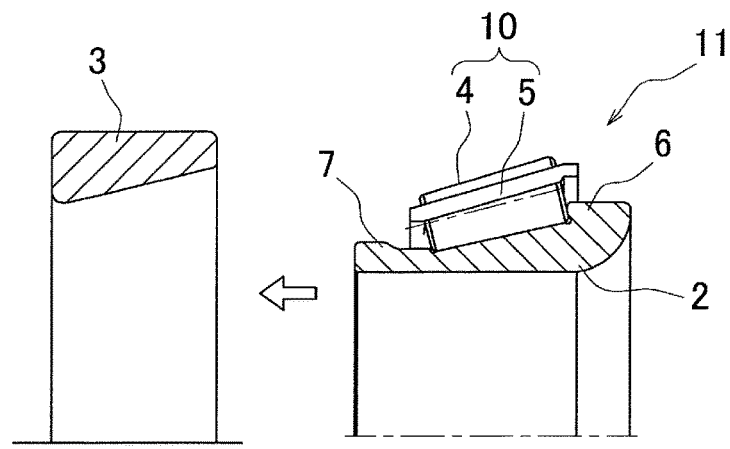
FIG. 5C illustrates process steps of assembling the tapered roller bearing.

The order in which the tapered roller bearing 1 is assembled will be described. Firstly, as shown in FIG. 5A, the tapered rollers 4 are retained in the respective pockets of the retainer 5 disposed such that the small diameter side of the retainer is the lower side, to form the assembly 10 of the rollers and the retainer. The rolling surfaces 4a of the respective tapered rollers 4 in the assembly 10 of the rollers and the retainer or the inner ring raceway 2a are greased. Thus, when the assembly 10 of the rollers and the retainer is subsequently incorporated into the inner ring 2, or when the bearing is rotated after completion of the assembling, the inner ring raceway 2a is less likely to be damaged due to contact with the tapered rollers 4. In FIGS. 5A to 5C, only a portion of the plural tapered rollers 4 in the assembly 10 of the rollers and the retainer is shown.

Next, as shown in FIG. 5B, the inner ring 2 is incorporated with the inner circumferential side portions of the tapered rollers 4 in the assembly 10 of the rollers and the retainer, to form an inner ring sub-assembly 11 as shown in FIG. 5C. In the inner ring sub-assembly 11, movement of each tapered roller 4 in the axial direction is regulated by the large collar portion 6 and the small collar portion 7 of the inner ring 2, and movement of each tapered roller 4 toward the outer diameter side is regulated by the retainer 5. Therefore, the tapered rollers 4 and the retainer 5 are prevented from dropping from the inner ring 2.

Thereafter, as shown in FIG. 5C, the inner ring sub-assembly 11 is incorporated into the outer ring 3. Since the tapered rollers 4 and the retainer 5 do not drop from the inner ring 2, incorporation of the inner ring sub-assembly 11 and other handling operations can be facilitated.

The retainer 5 made of resin is produced by, for example, injection molding, so as to have a final shape obtained when assembling into the bearing is completed. Therefore, when the retainer assembly 10 is incorporated into the inner ring 2, the retainer 5 is elastically deformed such that the inscribed circle diameter φ1 for the arranged rollers is larger than the outer diameter φd2 of the base level diameter section 7a of the small collar portion 7 of the inner ring 2. If the small collar portion 7 does not have the reduced diameter section 7b as indicated by a broken line in FIG. 4A, when each tapered roller 4 passes over the small collar portion 7, the tapered roller 4 is pressed against the small collar portion 7 and tilted toward the inner ring raceway 2a, and an edge, on the large diameter side, of the tapered roller 4 is likely to contact with the inner ring raceway 2a as described in "SUMMARY OF THE INVENTION".

Figure 4B:
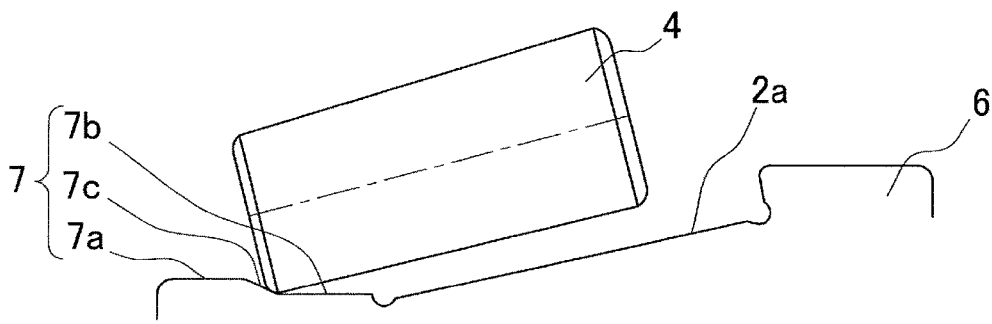
FIG. 4B is a partial view showing a different state of the tapered roller bearing.

However, in the case where the reduced diameter section 7b is provided, when the end, on the small diameter side, of each tapered roller 4 is disposed in a range of the axial length X, the tapered roller 4 is not pressed by the small collar portion 7. Therefore, as shown in FIG. 4B, the tapered rollers 4 are maintained at normal positions at which no external force acts on the tapered rollers 4. Therefore, the edge, on the large diameter side, of the tapered roller 4 and the inner ring raceway 2a do not rub against each other, and the inner ring raceway 2a can be prevented from being damaged. In the present embodiment, since the chamfered portion R having an arc-shaped cross-section is formed at each corner portion of the outer diameter surface of the small collar portion 7, damage due to contact between the small collar portion 7 and the tapered rollers 4 can be also prevented.

The axial length X is derived as follows. In FIG. 4A, an axial distance L1 from the edge, on the large diameter side, of the tapered roller 4 to the end surface 6a, on the inner ring raceway 2a side, of the large collar portion 6 is set so as to have the same value as the axial length X when the edge, on the small diameter side, of the tapered roller 4 is positioned at the same axial portion as the position A. Thus, the value of the axial length X can be minimized. An axial distance L2 from the point of intersection O to the end surface 6a, on the inner ring raceway 2a side, of the large collar portion 6 is represented as follows.

$$L2 = RBAS \cdot \cos\theta \quad \text{(Expression 2)}$$

An axial distance L3 from the point of intersection O to the edge, on the large diameter side, of the tapered roller 4 is represented as follows.

$$L3 = \{(\phi d2/2) + l \sin\alpha\}/\tan\theta \quad \text{(Expression 3)}$$

According to Expression 2 and Expression 3, the axial length X is represented as follows.

$$X = RBAS \cdot \cos\theta - \{(\phi d2/2) + l \sin\alpha\}/\tan\theta \quad \text{(Expression 4)}$$

Therefore, by the axial length X being defined as in Expression 1, when the assembly 10 of the rollers and the retainer is incorporated into the inner ring 2, the edge, on the large diameter side, of the tapered roller 4 can be prevented from being strongly pressed against the inner ring raceway 2a.

Figure 6:
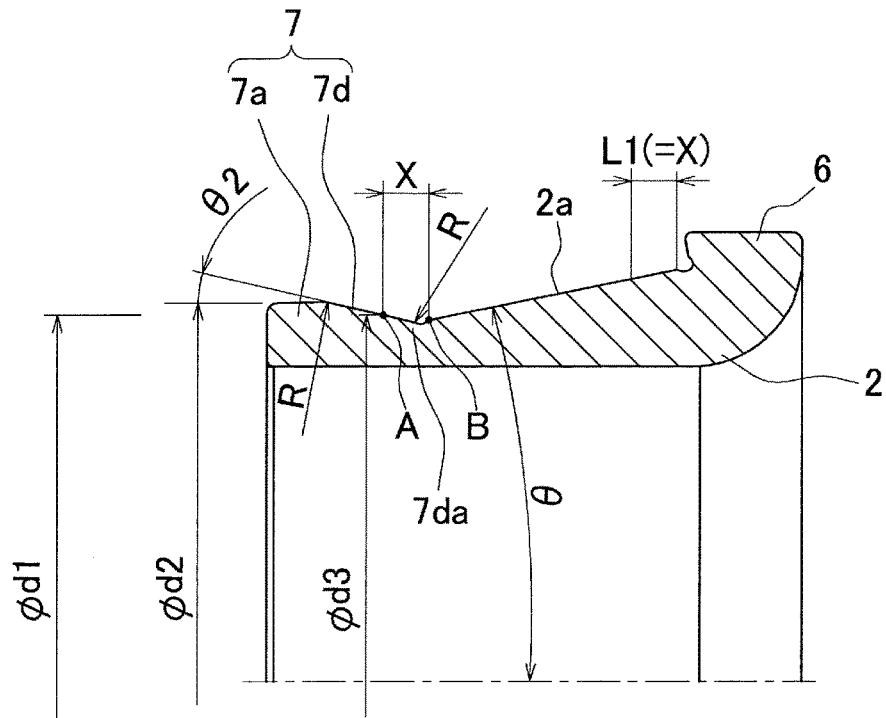
FIG. 6 is a cross-sectional view of an inner ring of a tapered roller bearing according to a second embodiment of the present invention.

FIG. 6 shows a second embodiment of the present invention. In the tapered roller bearing 1, the small collar portion 7 of the inner ring 2 has the base level diameter section 7a on the end surface side, and a tapered section 7d on the inner ring raceway 2a side. The base level diameter section 7a has an outer diameter surface in the form of a cylindrical surface. The tapered section 7d has such a tapered shape that its outer diameter is enlarged from the end on the inner ring raceway 2a side toward an opposing side away from the inner ring raceway 2a side. A section, of the tapered section 7d, having an outer diameter smaller than the inscribed circle diameter φd1 is defined as a reduced diameter section 7da. That is, the reduced diameter section 7da has a diameter smaller than the remaining sections (the base level diameter section 7a and a portion of the tapered section 7d) of the small collar portion 7. The other components are the same as in the embodiment described with reference to FIG. 1 to FIGS. 4A, 4B, and illustration and description thereof are not given.

Also in the present embodiment, the position A is defined such that the axial length X from the position A (in this example, a position at which the reduced diameter section 7da has a maximum outer diameter) at the end, on the base level diameter section side, of the reduced diameter section 7da, to the position B at the end, on the small diameter side, of the inner ring raceway 2a is represented by Expression 1 described above. Thus, when an assembly of the rollers and the retainer (not shown) is incorporated into the inner ring 2, the edge, on the large diameter side, of the tapered roller (not shown) is not strongly pressed against the inner ring raceway 2a, thereby preventing the inner ring raceway 2a from being damaged.

Reference Example

Figure 7:
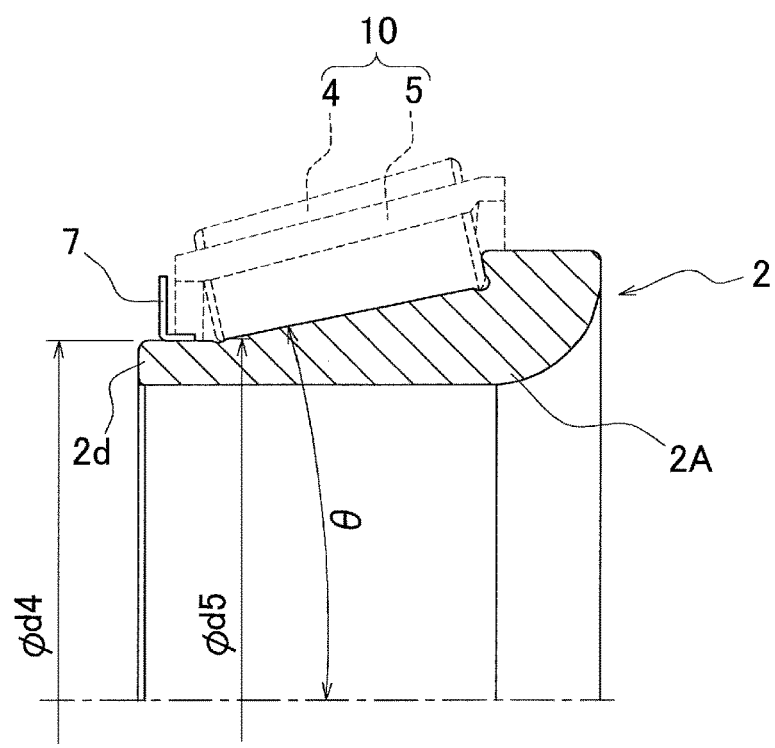
FIG. 7 is a cross-sectional view of an inner ring of a tapered roller bearing according to a reference example.

In order to prevent the inner ring raceway from being damaged when the assembly of the rollers and the retainer is incorporated into the inner ring, the small collar portion 7 of the inner ring 2 may be a component separate from an inner ring body 2A as shown in FIG. 7, and after the assembly 10 of the rollers and the retainer has been incorporated into the inner ring 2, the small collar portion 7 may be attached to the inner ring body 2A. In the illustrated example, the small collar portion 7 is obtained by a link-like steel plate being formed so as to have an L-shaped cross-section. The small collar portion 7 is fitted, with an interference, to an outer diameter surface of a small collar portion mounting section 2d of the inner ring body 2A, whereby the small collar portion 7 is mounted to the inner ring body 2A. A diameter φd4 of the outer diameter surface of the small collar portion mounting section 2d is smaller than a diameter φd5 of an end, on the small diameter side, of the inner ring raceway 2a. Further, the small collar portion 7 is mounted to the small collar portion mounting section 2d at a position at which interfering with the retainer 5 does not occur when the bearing rotates. Thus, when the small collar portion 7 is a component separate from the inner ring body 2A, grease confined in the bearing is blocked by the small collar portion 7, to prevent the grease from concentrating on the center portion of the bearing.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Tapered roller bearing
2 . . . Inner ring
2A . . . Inner ring body
2a . . . Inner ring raceway
2b . . . Recessed section on large collar portion side
2c . . . Recessed section on small collar portion side
2d . . . Small collar portion mounting section
3 . . . Outer ring
3a . . . Outer ring raceway
4 . . . Tapered roller
4a . . . Rolling surface
5 . . . Retainer
5a . . . Pocket
6 . . . Large collar portion
6a . . . End surface, on inner ring raceway side, of large collar portion
7 . . . Small collar portion
7a . . . Base level diameter section
7b . . . Reduced diameter section
7c . . . Stepped section
7d . . . Tapered section
7da . . . Reduced diameter section
10 . . . Assembly of rollers and retainer
11 . . . Inner ring sub-assembly
C . . . Bearing center axis
O . . . Point of intersection
φd1 . . . Inscribed circle diameter
φd2 . . . Outer diameter of small collar portion
φd3 . . . Outer diameter of reduced diameter section
φd4 . . . Outer diameter of small collar portion mounting section
φd5 . . . Outer diameter of end, on small diameter side, of inner ring raceway
θ . . . Tilt angle of inner ring raceway
θ2 . . . Tilt angle of rolling surface of tapered roller relative to outer diameter surface of reduced diameter section
α . . . Tilt angle of rolling surface of tapered roller relative to outer diameter surface of base level diameter section
RBAS . . . Distance from point of intersection of bearing center axis and inner ring raceway to end surface of large collar portion of inner ring
X . . . Axial length
L1, L2, L3 . . . Axial distance
l . . . Length of rolling surface of tapered roller

What is claimed is:
1. A tapered roller bearing comprising:
an inner ring;
an outer ring;
a plurality of tapered rollers interposed between the inner ring and the outer ring;
a retainer made of resin that retains the tapered rollers so as to prevent the tapered rollers from being removed on an outer diameter side,
wherein the inner ring is formed with a small collar portion, and the small collar portion has a reduced diameter section at a location neighboring an inner ring raceway of the inner ring, the reduced diameter section having an outer diameter surface of a diameter smaller than the remaining section of the small collar portion, and an outer diameter φd2 of the remaining section of the small collar portion is larger than an inscribed circle diameter φd1, and an outer diameter φd3 of the reduced diameter section is smaller than the inscribed circle diameter φd1 over the entire circumference thereof, where the inscribed circle diameter φd1 represents a diameter of a circle that is inscribed in the arranged tapered rollers in an assembly of the rollers and the retainer, in a condition the tapered rollers are retained by the retainer and the assembly has not been incorporated into the inner ring, wherein the reduced diameter section of the small collar portion is continued to a base level diameter section on an end surface side of the small collar portion via a stepped section, and the outer diameter surface of the reduced diameter section and the base level diameter section are formed as a cylindrical surface, and wherein the stepped section and the base level dimeter section are each formed as a tilt surface tilted relative to a radial direction and having a diameter that progressively decreases from the base level diameter section side toward the reduced diameter section.

2. The tapered roller bearing as claimed in claim 1, wherein either the inner ring raceway, or rolling surfaces of the plurality of tapered rollers in the assembly of the rollers and the retainer, is greased.

3. A tapered roller bearing comprising:
an inner ring;
an outer ring;
a plurality of tapered rollers interposed between the inner ring and the outer ring;
a retainer made of resin that retains the tapered rollers so as to prevent the tapered rollers from being removed on an outer diameter side,
wherein the inner ring is formed with a small collar portion,
the small collar portion has a base level diameter section and a tapered section,
a boundary between the base level diameter section and the tapered section is formed by a chamfer having an arc-shaped cross-section,
the tapered section connects the base level diameter section to an inner ring raceway of the inner ring,
the tapered section has an outer diameter that decreases from the base level diameter section to an end near the inner ring raceway,
a section of the tapered section is defined as a reduced diameter section,
the reduced diameter section has an outer diameter surface of a diameter smaller than the base level diameter section of the small collar portion,
an outer diameter φd2 of the base level diameter section of the small collar portion is larger than an inscribed circle diameter φd1,
an outer diameter φd3 of the reduced diameter section is smaller than the inscribed circle diameter φd1 over the entire circumference thereof, the inscribed circle diameter φd1 represents a diameter of a circle that is inscribed in the arranged tapered rollers in an assembly of the rollers and the retainer, in a condition in which, the tapered rollers are retained by the retainer and the assembly has not been incorporated into the inner ring, and an axial length X from an end, on the base level diameter section side, of the reduced diameter section to an end, on a small diameter side, of the inner ring raceway is defined based on
a tilt angle of the inner ring raceway relative to a bearing center axis,
a length of a rolling surface of the tapered roller, and
a tilt angle of the rolling surface of the tapered roller relative to an outer diameter surface, having a cylindrical shape, of the base level diameter section.

4. A tapered roller bearing comprising:
an inner ring;
an outer ring;
a plurality of tapered rollers interposed between the inner ring and the outer ring;
a retainer that retains the tapered rollers so as to prevent the tapered rollers from being removed on an outer diameter side,
wherein the inner ring is formed with a small collar portion,
the small collar portion has a reduced diameter section at a location neighboring an inner ring raceway of the inner ring and the reduced diameter section has an outer diameter surface of a diameter smaller than the remaining section of the small collar portion,
an outer diameter φd2 of the remaining section of the small collar portion is larger than an inscribed circle diameter φd1,
an outer diameter φd3 of the reduced diameter section is smaller than the inscribed circle diameter φd1,
the inscribed circle diameter φd1 represents a diameter of a circle that is inscribed in the arranged tapered rollers in an assembly of the rollers and the retainer, in a condition in which, the tapered rollers are retained by the retainer and the assembly has not been incorporated into the inner ring, and
an axial length X from an end, on a base level diameter section side, of the reduced diameter section to an end, on a small diameter side, of the inner ring raceway is defined so as to satisfy the following relational expression:

$$X \geq RBAS \cdot \cos\theta - \{(\phi d2/2) + L \cdot \sin\alpha\}/\tan\theta$$

where a distance from a point of intersection of a bearing center axis and the inner ring raceway to an end surface on the inner ring raceway side of a large collar portion provided in the inner ring is represented as RBAS, a tilt angle of the inner ring raceway relative to the bearing center axis is represented as θ, a length of a rolling surface of the tapered roller is represented as L, and a tilt angle of the rolling surface of the tapered roller relative to a cylindrical outer diameter surface of the base level diameter section on the end surface side is represented as α.

* * * * *

UNITED STATES PATENT AND TRADEMARK OFFICE
CERTIFICATE OF CORRECTION

PATENT NO. : 10,208,797 B2
APPLICATION NO. : 14/884261
DATED : February 19, 2019
INVENTOR(S) : Shuhei Nomura Page 1 of 1

It is certified that error appears in the above-identified patent and that said Letters Patent is hereby corrected as shown below:

In the Claims

In Column 9, Line 12:
In Claim 1, After "in a condition" insert -- in which --.

In Column 9, Lines 21-22:
In Claim 1, Delete "and the base level dimeter section are each" and insert -- is --, therefor.

In Column 10, Line 4:
In Claim 3, Delete "which," and insert -- which --, therefor.

In Column 10, Line 40:
In Claim 4, Delete "which," and insert -- which --, therefor.

Signed and Sealed this
Seventh Day of May, 2019

Andrei Iancu
*Director of the United States Patent and Trademark Office*